United States Patent [19]

Rantell et al.

[11] 3,884,704

[45] May 20, 1975

[54] CATALYST SYSTEM FOR ACTIVATING SURFACES PRIOR TO ELECTROLESS DEPOSITION

[75] Inventors: Alan Rantell, London, England; Abraham Holtzman, Bat-Yam, Israel

[73] Assignee: MacDermid Incorporated, Waterbury, Conn.

[22] Filed: Oct. 4, 1973

[21] Appl. No.: 403,503

[30] Foreign Application Priority Data
Mar. 21, 1973 United Kingdom............... 13545/73

[52] U.S. Cl. ................................. 106/1; 117/130 E
[51] Int. Cl. ............................................. C23c 3/02
[58] Field of Search .......... 106/1; 204/30; 117/47 A

[56] References Cited
UNITED STATES PATENTS

| | | | |
|---|---|---|---|
| 3,532,518 | 10/1970 | D'Ottavio | 204/30 X |
| 3,632,388 | 4/1969 | Grunwald et al. | 106/1 X |

*Primary Examiner*—Lewis T. Jacobs
*Attorney, Agent, or Firm*—Steward & Steward

[57] ABSTRACT

An electroless metal plating catalyst solution containing much smaller amounts of catalytic metal ion than required heretofore, and a particular method of preparing it at elevated temperature by reaction of a stannous salt and palladous or other similar catalytic metal ion, are disclosed.

6 Claims, No Drawings

CATALYST SYSTEM FOR ACTIVATING SURFACES PRIOR TO ELECTROLESS DEPOSITION

CROSS REFERENCE TO PRIOR RELATED APPLICATIONS

This application corresponds to British Provisional Specification No. 13545/73, filed Mar. 21, 1973.

FIELD OF THE INVENTION

The present invention relates to the preparation and use of a catalyst composition for activating non-conductive sufaces prior to electroless deposition of metals.

For the purpose of electroless or chemical plating of non-conductive substrates, small quantities of activator or catalyst must first be placed on the surface of the substrate. Palladium is found to be the most satisfactory catalyst but any metal selected from palladium, gold, silver or the platinum group of metals is suitable.

The activating or catalyzing process is often carried out by consecutive immersion of the substrate in solutions containing $SnCl_2$ and $PdCl_2$ respectively. More recently the use of single step activators comprising colloidal mixtures of $PdCl_2$ and $SnCl_2$ has been proposed. See U.S. Pat. Nos. 3,650,913 and 3,532,518. Typical working strength catalyst solutions contain:

| | | |
|---|---|---|
| $PdCl_2$ | 300 – 1000 | mg/l |
| $SnCl_2$ | 15 – 50 | g/l |
| $Na_2SnO_3 \cdot 3H_2O$ | 1 – 7 | g/l |
| HCl | 250 – 300 | ml/l |

However, these $PdCl_2/SnCl_2$ mixtures are more effective when used in conjunction with an additional treatment solution known as an accelerator. Accelerators are generally solutions of strong acids or strong alkalis and are employed between the catalyst treatment and electroless deposition.

The method and conditions of preparation of $PdCl_2/SnCl_2$ mixtures is critical. Further, the high concentration of $PdCl_2$ employed makes the catalyst solutions very expensive. Less critical yet cheaper solutions would be an advantage.

SUMMARY OF THE INVENTION

The present invention involves a catalyst solution of much lower catalytic metal ion concentration than has been effective heretofore, and a method is disclosed for forming such highly active compound by reaction at high temperature between a stannous salt, usually the chloride, and low concentrations of palladous or other similar catalytic ions; e.g. Au(I), Au(III), Pt(II), Pt(IV), Rh(III), Ru(III), Ru(IV), Os(III), Os(IV), Ir(III), Ir(IV) or Ag(I), in the presence of hydrochloric acid. Catalytic metal concentrations below 30 mg/l of palladium, down to as little as about 6 mg/l, are found to be effective with conventional electroless metal plating solutions.

In one method of implementing the present invention, the catalyst is formed by heating the component supplying the catalytic ion in strong hydrochloric acid solution at temperatures in excess of 75°C, and then adding an excess of stannous ion. The temperature of the mixture is maintained above 75°C until the reaction is completed. During the reaction, the color of the mixture changes from light amber to dark brown, returning to light amber. Finally the completion of the reaction is indicated when the color of the mixture becomes dark brown for the second time. This may take from 1 to 30 minutes, for example, depending on the temperature employed, the higher the temperature the shorter the reaction time.

Alternatively the stannous ion may be added in two stages. Sufficient stannous salt to carry out the reaction is first added to the aqueous acid solution of catalytic ion at temperatures in excess of 75°C. The quantity required may be between 2 and 50 g/l as $SnCl_2$ depending on temperature and concentration of catalytic ion. When the reaction is complete after 1–20 minutes, a vast excess of acid stannous salt solution is then added. Small quantities of sodium stannate are found useful for stabilizing the compound formed between Sn(II) and the catalytic ion, e.g. (Pd(II)).

The preheating of the reactants to temperatures in excess of 75°C prior to admixing them in the preparation step is a presently preferred method of preparation. The catalytic activity of the reaction product formed between Sn(II) and the catalytic ion, e.g. Pd(II), increases with the increase of reaction temperature during manufacture, allowing low concentrations of catalytic ion to be used. At temperatures below 75°C much greater concentrations of catalytic ion and/or much longer reaction times are usually required in order to maintain catalytic activity; viz. greater than 150 mg/l of $PdCl_2$. The reaction between Sn(II) and Pd(II), i.e. the catalytic ion, may take two routes. It is postulated that the desired reaction yields a Sn(II)/Pd(II) addition compound, in preference to a secondary reaction which causes formation of metallic palladium and is generally believed to be undesirable. The use of high manufacturing temperatures and excess stannous salt encourages the preferred reaction and inhibits the secondary reaction.

The invention is illustrated by the following examples for the preparation and use of the catalyst.

EXAMPLE I

For 1 liter of working strength catalyst a mixture containing:

| | |
|---|---|
| $PdCl_2$ | 45 mg. |
| HCl (37% w/v) | 200 ml. |
| $H_2O$ | 400 ml. | is heated to 90°C and reacted with a solution containing:

| | |
|---|---|
| $SnCl_2\ 2H_2O$ | 150 g. |
| $Na_2\ SnO_3\ 3H_2O$ | 4 g. |
| HCl (37% w/v) | 300 ml. |

The temperature is maintained at 90°C for 15 minutes and then allowed to cool prior to use.

The catalyst may be used to activate plastic surfaces or copper clad printed circuit boards prior to electroless deposition. For the plating of ABS plastics the following processing cycle is preferred:

ABS plastic is etched in a mixture containing 200–400 g/l $CrO_3$ and 300–600 g/l $H_2SO_4$ at 40°–70°C for 2–10 minutes. After thorough rinsing, the plastic is immersed in the catalyst solution for 1–5 minutes at room temperature. For increased activation it is permissible to heat the catalyst solution to temperatures up to 60°C. After further rinsing, the plastic is immersed in an accelerator solution containing 20–100 g/l NaOH for 1–5 minutes at 20°–60°C. The preferred temperature of the accelerator is 40°C. The activated plastic is then immersed in any electroless nickel or copper plating solution. A preferred composition is:

| | |
|---|---|
| NiSO$_4$ 6H$_2$O | 15 g/l |
| NH$_4$Cl | 30 g/l |
| Na H$_2$PO$_2$ | 60 g/l | pH adjusted to 8·0 - 8·5 with NH$_3$.
The electroless nickel solution is employed at 20°–30°C for 20–30 minutes.

EXAMPLE 2

For 1 liter of working strength catalyst a mixture containing:

| | |
|---|---|
| PdCl$_2$ | 45 mg. |
| HCl (37% w/v) | 200 ml. |
| H$_2$O | 400 ml. | is heated to 90°C and then reacted with 20g SnCl$_2$·2H$_2$O. After the reaction has continued for a period of 15 minutes, there is then added a mixture containing:

| | |
|---|---|
| SnCl$_2$·2H$_2$O | 100 g. |
| Na$_2$SnO$_3$ 3 H$_2$O | 4 g. |
| HCl(37% w/v) | 250 ml. |

The time allowed for the reaction of the first addition is not critical and may be for any period greater than 1 minute, but 15 minutes is preferred. The reaction temperature again is important, as it should be greater than 75°C, 90°–95°C being preferred.

The catalyst solution may be used to activate plastic surfaces in the manner described in Example 1.

EXAMPLE 3

The catalyst is prepared and used as in Example 1 except that in this instance the PdCl$_2$ is replaced by 75 mg of HAu Cl$_4$.

The activated catalysts referred to in the invention do not appear to be colloidal in nature. Tyndall effect measurements taken on the undiluted catalyst solutions and electron microscopy of the absorbed catalyst fail to show any colloidal particles. Although it is still a matter of some speculation, it seems that the active component of the SnCl$_2$/PdCl$_2$ catalyst is an acid soluble complex formed between Sn(II) and Pd(II). On contact with the accelerator solution, a slow redox reaction then occurs, as follows:

$$Sn(II) + Pd(II) = Sn(IV) + Pd(O).$$

The elemental palladium formed can then initiate electroless deposition.

A concentration of catalytic metal ion in solution equivalent to about 50 mg/l of PdCl$_2$ (equivalent to about 30 mg/l palladium metal) is a desired operating level in the catalyst bath. Lower concentrations down to as low as 10 mg/l of PdCl$_2$ (6 mg/l of palladium metal content) are operative to some degree. Concentrated hydrochloric acid is the preferred acid and should be present in proportion to about 400–500 ml/l in solutions containing the preferred working level of palladium, as illustrated by the examples.

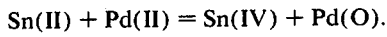

What is claimed is:

1. A method for preparing a catalyst solution by heating a hydrochloric acid solution of a catalytic ion selected from the group consisting of Pd(II), Au(I), Au(III), Pt(II), Pt(IV), Rh(III), Ru(III), Ru(IV), Os(III), Os(IV), Ir(III), Ir(IV), Ag(I) with a solution containing a stochiometric excess of stannous salt wherein at least one of said solutions is first heated to a temperature in excess of 75°C before the other is added to it, and said elevated temperature is maintained during the progress of the reaction upon admixing the solutions, the concentration of the selected catalytic ion being equivalent to 6 to 30 mg/l of palladium metal in solution and said acid being present in the ratio of 400–500 milliliters of concentrated hydrochloric per liter of catalyst solution for each 30 milligrams of catalyst metal present in solution.

2. A method for preparing a catalyst as in claim 1, wherein the acid is hydrochloric and the catalytic ion is Pd$^{2+}$ as PdCl$_2$ used at concentrations of 10–50 mg/l in the catalyst solution.

3. A method for preparing a catalyst as in claim 2, wherein the catalytic ion solution is first heated to a temperature of about 90°C and the stannous salt solution is then added to such preheated solution.

4. A method for preparing a catalyst as defined in claim 3, wherein the catalytic ion solution contains in addition to water about 45 mg/l of Pd$^{2+}$ PdCl$_2$ and 200 ml/l concentrated hydrochloric acid, said stannous salt solution contains in addition to water about 150 g/l of SnCl$_2$·2H$_2$O and 4 g/l of Na$_2$ SnO$_3$·3H$_2$O and 300 ml/l of concentrated hydrochloric acid.

5. A method for preparing a catalyst as defined in claim 3, wherein the catalytic ion solution contains in addition to water about 45 mg/l of Pd$^{2+}$ as PdCl$_2$ and 200 ml/l concentrated hydrochloric acid, and this is first reacted with about 20 g/l of SnCl$_2$·2H$_2$O for approximately 1 to 15 minutes, after which there is added while maintaining said temperature a further stannous salt solution containing about 100 g/l SnCl$_2$·2H$_2$O and 4 g/l Na$_2$ SnO$_3$·3H$_2$O and 250 ml/l of concentrated hydrochloric acid.

6. A catalyst solution for use in an electroless plating process, which consists essentially in addition to water of a catalytic ion selected from the group consisting of Pd(II), Au(I), Au(III), Pt(II), Pt(IV), Rh(III), Ru(III), Ru(IV), Os(III), Os(IV), Ir(III), Ir(IV), Ag(I) in concentration to provide the equivalent of from about 6 to 30 mg/l of palladium metal in solution, stannous chloride in stochiometric excess of the amount required and concentrated hydrochloric acid in the ratio of at least 400–500 milliliters per liter of catalyst solution for each 30 milligrams of catalyst metal present in solution.